United States Patent [19]
Turpin

[11] Patent Number: 5,964,872
[45] Date of Patent: Oct. 12, 1999

[54] METHOD AND SYSTEM FOR TAILORING COMMON ENVIRONMENTS

[75] Inventor: Kevin Turpin, Provo, Utah

[73] Assignee: Novell, Inc., Provo, Utah

[21] Appl. No.: 08/815,716

[22] Filed: Mar. 12, 1997

Related U.S. Application Data

[60] Provisional application No. 60/013,476, Mar. 15, 1996.

[51] Int. Cl.[6] .................................................. G06F 9/445
[52] U.S. Cl. .................................... 713/1; 713/2; 713/100
[58] Field of Search ................................ 395/200, 200.5, 395/284, 339, 651, 677, 681, 700, 712, 800

[56] References Cited

U.S. PATENT DOCUMENTS

| | | | |
|---|---|---|---|
| 5,347,632 | 9/1994 | Filepp et al. | 395/200 |
| 5,430,878 | 7/1995 | Straub et al. | 395/700 |
| 5,581,765 | 12/1996 | Munroe et al. | 395/677 |
| 5,594,910 | 1/1997 | Filepp et al. | 395/800 |
| 5,613,119 | 3/1997 | France et al. | 395/651 |
| 5,630,076 | 5/1997 | Saulpaugh et al. | 395/284 |
| 5,732,275 | 3/1998 | Kullick et al. | 395/712 |
| 5,758,072 | 5/1998 | Filepp et al. | 395/200.5 |
| 5,796,967 | 8/1998 | Filepp et al. | 395/339 |
| 5,802,365 | 9/1998 | Kathail et al. | 395/681 |

*Primary Examiner*—Hassan Kizou
*Assistant Examiner*—Nguyen Xuan Nguyen
*Attorney, Agent, or Firm*—Dinsmore & Shohl LLP

[57] ABSTRACT

An automated method and system for tailoring a plurality of commonly configured computer environments. The method includes searching one of the commonly configured environments for predetermined data items which must be tailored in each environment. Tailored data items are generated for each of the predetermined data items, and a table is made indicating where in each common environment each particular tailored data item should be stored. A store process executes in each common environment, and reads the table and stores the tailored data items at the appropriate locations. The method achieves the rapid reconfiguration of many computers in a reliable manner.

17 Claims, 6 Drawing Sheets

METHOD AND SYSTEM FOR TAILORING COMMON ENVIRONMENTS

RELATED APPLICATIONS

This application claims the benefit of U.S. Provisional Application No. 60/013,476, filed Mar. 15, 1996.

TECHNICAL FIELD

This invention relates generally to configuring computers, and more particularly to uniquely tailoring commonly configured computers.

BACKGROUND OF THE INVENTION

The configuration of a computer is driven primarily by information contained on a persistent storage device, such as a disk drive, to which the computer is coupled. Although two distinct computers can have different processors, or other different hardware components, such as a BIOS ROM for example, for the most part, if the computers share a common processor architecture, their observed behavior will be determined by such things as the operating system which is booted when the computer is turned on, the settings in various configuration files, and the application software which is available, all of which is determined by data on the disk drive.

In certain environments, such as an office, a training laboratory, or a testing laboratory, for example, many computers are coupled to a network, and each computer is used for primarily the same purpose. In such environments, it is frequently useful if the computers are configured nearly identically.

For instance, in an office environment, many companies have found it necessary to hire staff whose primary function is to help computer users with day-to-day problems encountered with their computer. The cost of such staff can be substantial because of the relatively high salary costs of good computer support personnel. Of course, the less computer problems encountered, the less support personnel are required. One way to reduce such support costs is to configure each computer as identically as possible, so problems encountered by any one individual are likely to be the same problems encountered by other individuals. After determining the solution to a problem once, the same solution can be implemented in a relatively quick manner for anyone else encountering the problem. This greatly reduces the problem analysis time required, which is frequently the most expensive component of solving computer-related problems. In fact, if computer environments are all highly similar, frequently once a user learns of a solution to a problem, they can alert co-workers to the solution without the need to even contact a computer support person.

Such commonly configured computer environments are also useful in a training environment. Training laboratories are widely used to teach the use of computer software to a number of computer users at the same time. Because of the complexity of software and the continuous release of new and enhanced computer software products, computer software training is an economically important business. A training laboratory is typically a room with many computers coupled to a network, to allow each student to have hands-on experience with the software on which they are being trained. Since the very nature of training implies a lack of familiarity with the software among the students, it is not uncommon for a trainer to spend a great deal of time answering problems encountered by the students while they attempt to use the software. So that each student is exposed to the same operating behavior of the software, the trainer will typically configure each computer with a common environment which the trainer has determined best facilitates teaching the proper use of the software to the students. In addition to the consistent behavior gained by having common computer environments, it is likely that students using computers with common computer environments will encounter some of the same difficulties, so a trainer can answer a question once, and each student can benefit from the answer.

A testing laboratory is yet another environment in which commonly configured computers can be useful. Developers of software frequently wish to stress-test, or otherwise test their software, which requires an environment in which a number of computers all simultaneously access the tested software. Because the focus of the test may be its ability to handle a large volume of transactions, or its ability to handle multiple users, for example, it is desirable that the computers used in the test environment are configured as nearly identically as possible, so that any problems encountered can be isolated either to the common configuration, or the software itself, and individual computers need not each be analyzed to determine if a single computer configuration is the cause of a problem.

The difficulty in creating common computer environments is not in configuring the disk drives of computers in an identical manner, but rather is in the process of uniquely tailoring each computer configuration so it can have a separate identity from the other computers. This is necessary because each computer environment must have certain unique data which uniquely identify either the computer itself, or the user of the computer. For example, each computer coupled to a TCP/IP network must have a unique IP identifier so messages can be properly delivered to the computer over the network. The IP identifier is typically stored locally on the disk drive of the computer. A logon program will frequently require entry of a unique user identifier and a password before access will be given to a network server, to establish the access level a particular user has to the resources on the server. The user identifier can be stored in a file on the local disk drive. Similarly, the computer operating system may require entry of a unique user identifier and password before access to the computer will be permitted. Such user identifier and password may be stored on the local hard drive. Another example relates to computer programs, which typically have a configuration file, such as a '.INI' file, which can contain data which must be unique to each user on a network.

Conventional methods for applying these unique identifiers to each computer environment involve manually editing and storing the appropriate tailoring information on each computer. This can be extremely time-consuming, and like all manual processes, fraught with the potential for errors, for which computers typically have little tolerance. The amount of time it takes to apply unique identifiers to each computer can be very important in environments which require rapid reconfigurations of computers, such as the training and testing environments discussed above. Because such training laboratories can be relatively expensive to create and maintain, each training laboratory is typically used to teach many different software courses. Thus, the configuration of computers used to teach students one operating system today will be quite different from the configuration of the same computers used to teach students another operating system tomorrow. Some training environments include hundreds of computers, and uniquely tailoring each of the computer environments for each new training class is a massive and time-consuming effort. Further, such an effort can require additional personnel which increases the cost of training, and frequently prevents a rapid transition from one training environment to another training environment, which can result in a loss of revenue while the training environment is being reconfigured.

It is apparent that an automated process for tailoring common computer environments in a quick and reliable manner would be desirable.

SUMMARY OF THE INVENTION

It is one object of this invention to provide an automated method and system for tailoring each of a plurality of commonly configured environments.

It is another object of this invention to provide an automated method and system for rapidly reconfiguring computers used in a training environment.

It is yet another object of this invention to provide an automated method and system for rapidly implementing a predetermined testing environment.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a method and system is provided for applying a unique data item to each of a plurality of commonly configured computer environments. The method includes searching for a common data item in a first common environment, locating the common data item in the first common environment, and storing information indicating the location of the common data item. A unique data item is generated for each of the plurality of common environments, and one of the unique data items is stored in each common environment at the same address as that of the location of the common data item in the first common environment.

According to one embodiment of this invention, each common environment contains a plurality of common data items, each of which must be replaced with a unique data item. A search process reads a file which contains each common data item, and for each common data item in the file searches one of the common environments for each occurrence of the common data item. The search process creates an output file containing the address in the common environment where each occurrence of each common data item is located. Each common environment contains the same data at the same location, and thus, the address of the location of each common data item is the same among all common environments.

Each common environment is preferably accessible over network via the computer associated with the common environment. Each network-attached computer has a hardware-implemented unique network identifier used to distinguish each computer on the network. A second process obtains the unique network identifiers of the computers, and using the output file created from the search process, creates a second output file containing a list of network identifiers, common data items, and addresses of the locations of the common data items in each common environment. A file modification process inputs this second output file and replaces each common data item with a unique data item. A store process then reads this file, finds the unique network identifier associated with a particular common environment, and stores the unique data items at the indicated address in the common environment, tailoring the common environment. Unique data items can include user identifiers, IP addresses, and other distinguishing data.

The method and system according to this invention has utility in any environment in which numbers of computers must be commonly configured, such as office environments, training environments and testing environments. The disclosed invention can be used to quickly transition a computer from a first configuration to a second configuration, by precisely identifying the locations on the disk drive where common environments must be uniquely tailored.

According to another embodiment of this invention, the input file containing the unique data items is located on a file server accessible from each of the commonly configured environments. The store process can then be executed in each commonly configured environment and directed to utilize the input file on the file server. Thus, each commonly configured environment can be uniquely tailored by manually initiating the store process in each commonly configured environment, or by remotely initiating the store process from another computer which has the ability to initiate a process in the common environment.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different, obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF PREFERRED EMBODIMENTS

Figure 1:
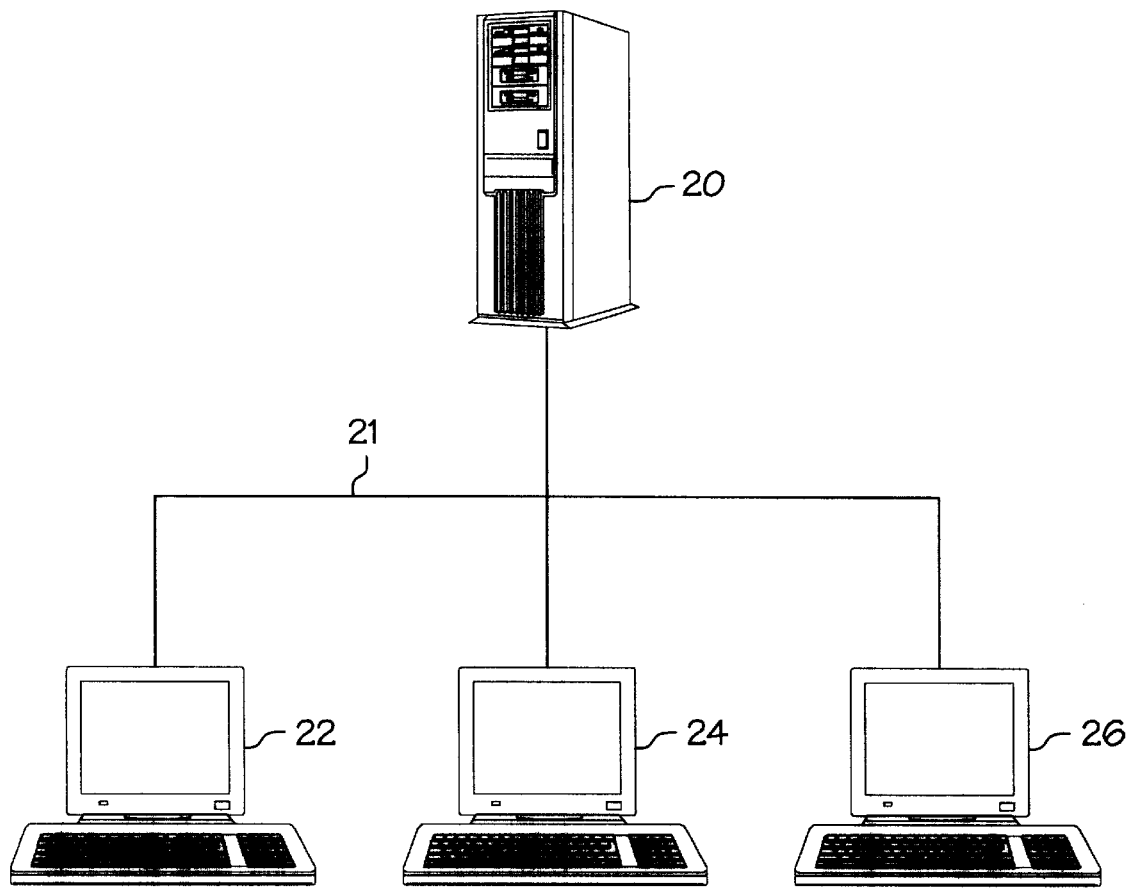
FIG. 1 is a schematic view of a computer environment in which the present invention can be practiced.

Referring to FIG. 1, a schematic of a computer environment in which the present invention can be carried out is shown. Server 20 and computers 22, 24 and 26 are coupled to network 21. Each of computers 22, 24 and 26 has its own persistent storage device, such as a disk drive, from which software is loaded to control the respective computer. The phrase "common environment" will be used herein to refer to at least a portion of each of the persistent storage devices which contain identical data at the identical location, or address. Each common environment includes data, referred to as common data items, which must be made unique with respect to the other common environments in order to distinguish the computers from each other. The amount of common data items is typically relatively small compared to the overall amount of identical data on the persistent storage device. The process described herein for making such common data items unique will be referred to as 'tailoring', and the resulting environment will be referred to as a tailored common environment. The persistent storage device on which the common environment exists is associated with a computer.

The need for tailored common environments arises in many situations. For example, training laboratories typically include many computers, each of which will execute the software on which users are being trained. It is preferable that each of the computers are identically configured to ensure each student is exposed to the identical computer environment. Since even subtle changes to a computer configuration can result in different behavior and/or errors not encountered by students of computers with different configurations, a tailored common configuration is a highly desirable feature. A software testing laboratory is another example of a situation in which computers having a tailored common environment are highly desirable. Developers of software frequently use such testing laboratories to uncover bugs that may occur because of the volume of transactions, or the number of users, rather than configuration-specific problems. Such a testing environment preferably comprises computers with tailored common environments such that it can be quickly determined whether a problem is due to a computer configuration or is due to the software itself. An office environment is another example of where tailored common environments are highly desirable. As computers proliferate across the desks of employees, computer trained personnel must be hired to answer questions and resolve problems encountered by such employees. Having tailored common environments greatly reduces the analysis time necessary for support personnel to determine what is causing any particular problem, and greatly increases the likelihood of different users having similar problems instead of each user having unique problems.

The creation of such tailored common environments is desirable not only for the reasons set forth above, relating to consistency of configurations across multiple computers, but also because of the speed by which computers can be commonly configured. One such mechanism for creating common environments on several different computers involves first configuring the disk drive of one computer to have the desired configuration. The configured portion (also referred to as a 'disk image') includes all the software and data which make up the common environment. The desired configuration can be limited to a portion of the disk drive, such as a partition, or can involve the entire disk drive. The configured portion is then transferred to each of the other computers. This can be accomplished by first transferring the disk image to a file server which is coupled to each of the other computers via a network. To load the disk image at the same address ranges of each disk drive, a program can use BIOSDISK or similar calls to transfer the image from the configured computer to the file server. The use of the BIOSDISK function, or other functions containing similar functionality, to specify particular track, cylinder and offset locations on a disk drive are well known to those skilled in the art. Another program using BIOSDISK calls can then be executed on the appropriate computers to transfer the disk image from the server to the appropriate location on the disk drive of each computer. At the end of this process, the computers have an identical image at identical locations on their associated disk drives. Because BIOSDISK calls are used to transfer the image rather than higher level application software, such as file copying utilities, the transfer of the disk image from the file server to the computer's persistent storage device is relatively fast. In this manner, large numbers of computers can be quickly configured such that they each have a common environment.

The creation of the common environments is only the first part of the ultimate goal—that of creating tailored common environments. Each common environment contains data items which must be unique in order to distinguish the computers, or the users of the computers. Conventional tailoring mechanisms require editing the appropriate data files on each computer, and manually changing the appropriate unique identifiers. This is time-consuming, and the manual entry of data always increases the probability of errors. The method and system according to this invention automate this process so that the tailoring of the common environments is quick and reliable.

Figure 2:
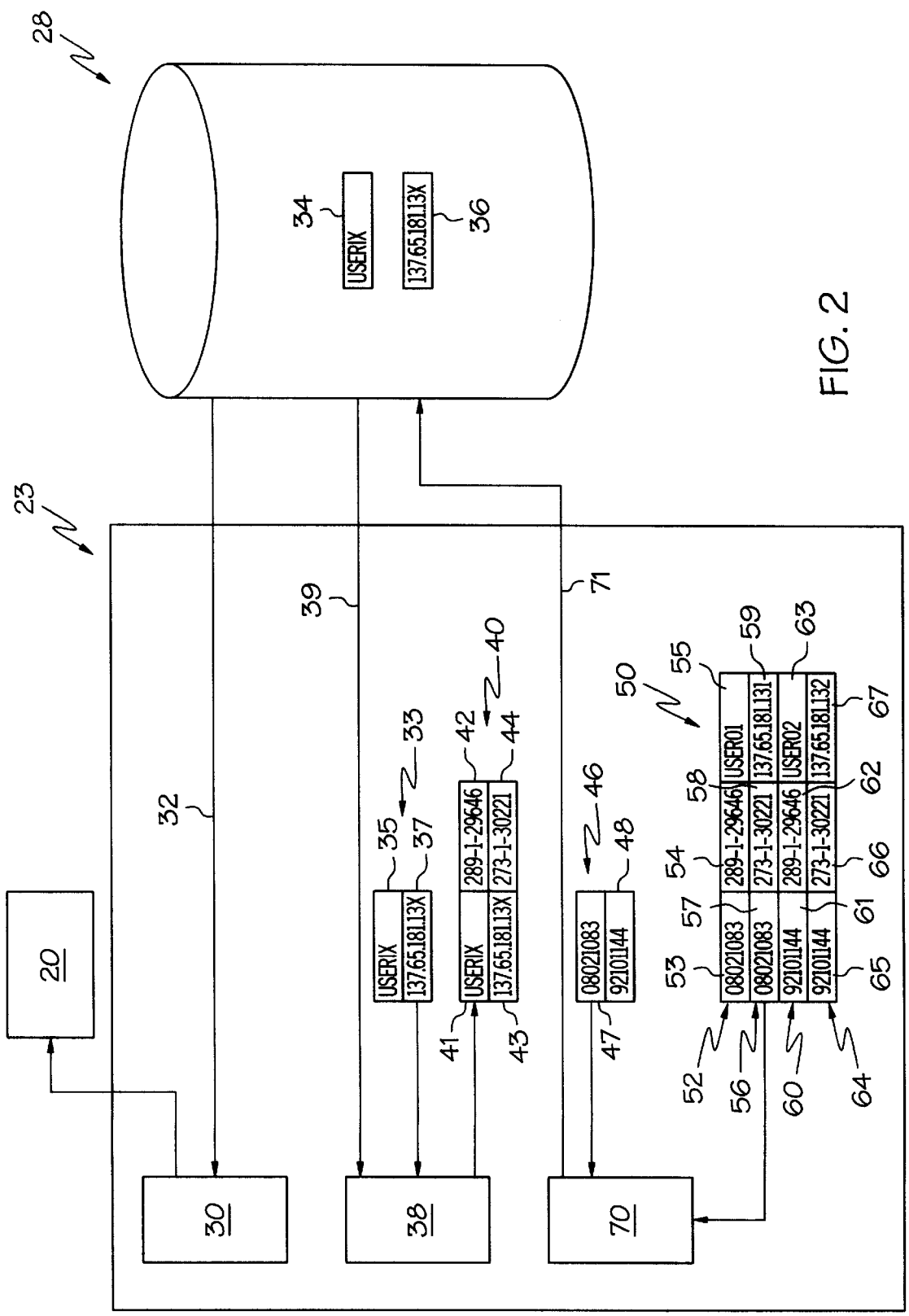
FIG. 2 is a block diagram illustrating aspects of the method and system according to one embodiment of this invention.

FIG. 2 shows a block diagram illustrating various aspects of the system of the present invention, as well as the creation of a common environment. Block 23 includes generally the processes, or tasks, which can execute on a particular computer, such as computer 22, to implement one embodiment of the system of the present invention. By process or task, it is meant the functionality provided by certain code segments. Such processes can be integral in a single module, or can be implemented in separate modules. A persistent storage device such as disk drive 28 is first configured with a particular environment which includes the appropriate software and data files which compose the common environment. According to the method of this invention, part of the process for creating the initial common environment on disk drive 28 is to identify the data on disk drive 28 which will need to be modified to create the tailored common environments. For example, data item 34 may comprise the user identifier used to login to the computer operating system. When creating the initial common environment, the file containing data item 34 is opened, and data item 34 is modified to contain an arbitrary searchable string pattern such as 'USER1X'. Another example of such a data item might be an Internet protocol (IP) address which must be unique for each computer, such as data item 36. Again, data item 36 is edited to contain an arbitrary searchable string pattern such as '137.65.181.13X'. Similar arbitrary searchable strings are made for all other data items on persistent storage 28 which will have to be tailored. This initial editing can be accomplished through the use of a conventional text editing program, such as a word processor.

After the appropriate data items have been modified to contain searchable patterns, image process 30 reads disk drive 28, as indicated by arrow 32, and transfers the disk image to file server 20. The disk image transferred to file server 20 can comprise the entire range of data on disk drive 28 or merely a portion of the data, for example a particular partition of disk drive 28. After the disk image is transferred to file server 20, a program can be initiated on computers 24 and 26 to transfer the image from file server 20 to their associated disk drives. After the disk image is transferred to computers 24 and 26, each of the disk drives associated with computers 22, 24 and 26 has a common environment which includes data items 34 and 36.

The present invention, starting with the common environments as set forth above, tailors the common environments in a two phase process. The first phase involves the creation of a data structure, or file, which is used in the second phase to direct how each particular common environment is tailored. The second phase includes executing on each computer having a common environment a process which reads the file created in the first phase, and tailors the common environment coupled to the respective computer on which the process is running as directed by the data in the file. The first phase can be completed on any of the computers having the common environment, but for simplicity will be shown and described as being executed on the same computer used to create and transfer the disk image from disk device 28 to server 20.

FIRST PHASE

A data structure such as list 33 is manually created which contains the data items in the common environment which will be tailored during the second phase. These data items will be the same as the searchable strings created during the initial creation of the common environment. The word 'list' refers to any data structure, such as an array, or a file, which can be read by the appropriate process. Search process 38 reads data items 35 and 37 from list 33, and searches disk drive 28 for each occurrence of data items 35 and 37. Search process 38 creates a data structure such as list 40 which contains data items 35 and 37 from list 33, as well as the address of the location in disk drive 28 of each occurrence of each of the entries in list 33. For example, list 40 illustrates that entry 41 is located at the address stored in entry 42, which is cylinder 289, head 1 and offset 29646. Entry 42 can comprise any suitable address which indicates specifically where an occurrence of entry 41 is located in disk device 28.

List 46 contains a unique identifier associated with each computer having a common environment. One example of such a unique identifier is the Media Access Control (MAC) address of each computer, as represented by entries 47 and 48. The MAC address is used to uniquely identify a computer to a network. List 46 can be generated programmatically, or manually, through the use of standard commands which identify the MAC addresses of computers coupled to a network. For example, in the Novell NetWare® Operating System, a 'nlist user/b' command can be used to create a list of the MAC addresses of the computers coupled to the network. Such a list can then be edited to include only those MAC addresses of computers having a common environment. Although the embodiment discussed herein uses the MAC address of the computer to identify each particular computer, it is apparent that other information which identifies each computer could be used. The information in list 46 can then be combined with the information in list 40 to create list 50. Each row in list 50 includes the unique identifier, such as the MAC address, of a particular computer, the location of an occurrence of one of the data items from list 33, and a unique identifier which will be written to that location to uniquely tailor the common environment associated with the computer having that particular MAC address. For example, row 52 of list 50 includes entry 53 which contains the MAC address of a particular computer, entry 54 which is the address of a location in the common environment of the user searchable string 'USER1X', and entry 55 which is the unique data item, 'USER01', to be stored at that location. List 50 can contain one row for each common data item which must be tailored during the second phase.

During the second phase of the present invention, store process 70 is executed on each computer which is associated with a common environment. Store process 70 determines the MAC address of the computer on which it is running, and searches list 50 for entries associated with that particular MAC address. For each such entry, store process 70 stores the corresponding data item at the specified address in list 50 on the disk drive of the computer. Because store process 70 need not first search the disk drive before it stores the unique data item it executes very rapidly. Thus, store process 70 can quickly tailor each of the common environments. After the tailoring method of the present invention completes, a plurality of tailored common environments exist which differ from each other only by the unique identifiers.

Figure 3:
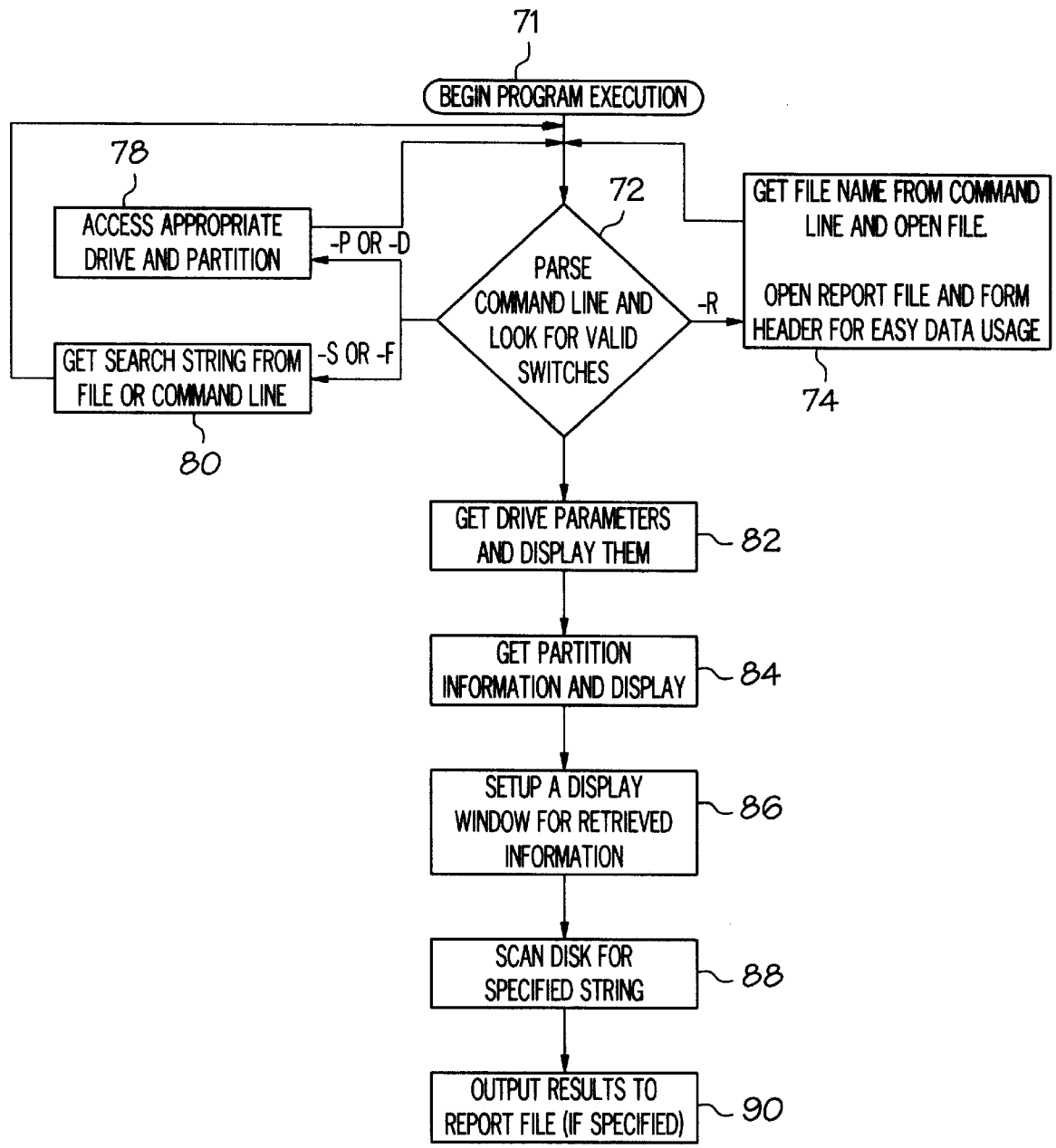
FIG. 3 is a flow diagram illustrating a method for performing a scan process according to one embodiment of this invention.

FIG. 3 is a flow diagram illustrating search process 38 in more detail. At block 71, search process 38 is initiated on one of the computers having a common environment. Search process 38 can have a plurality of run-time options, or switches. The 'S' switch can be used to indicate a single data item for which search process 38 should search. If the 'S' switch is used, list 33 in FIG. 2 is not necessary. The 'F' switch allows the specification of a path and file name of a file, such as list 33, containing one or more data items for which search process 38 should search. The 'R' switch allows the specification of a path and file name of a list, such as list 40, where search process 38 will store the results of the search. The 'P' switch allows the specification of a particular partition of the disk drive to be searched. The 'D' switch allows the specification of a particular drive which search process 38 should use when conducting its search. Blocks 72, 74, 78 and 80 relate to processing any switches which have been specified. After processing the switches, at block 82 search process 38 obtains the drive parameters, such as the number of cylinders, heads and sectors the drive contains, and displays them to the user. At block 84 search process 38 obtains and displays the partition information to the user. At block 86 search process 38 generates a window to display the results of the search as the search is conducted. At block 88 search process 38 searches the disk drive for the data items in list 33. At block 90 search process 38 outputs a data file such as list 40 which contains the addresses of the locations of the data items 33 on the disk drive.

Figure 4:
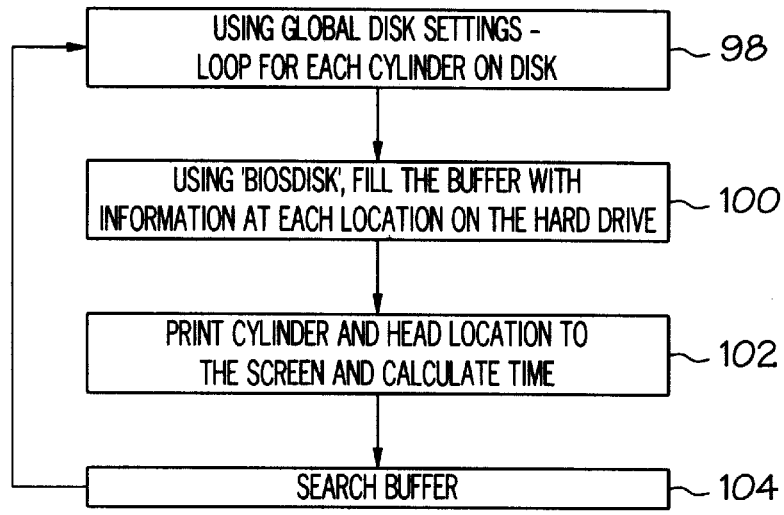
FIG. 4 is a flow diagram illustrating certain aspects of the process shown in FIG. 3 in more detail.

FIG. 4 is a flow diagram illustrating in greater detail the searching process represented at block 88 of FIG. 3. At block 98 search process 38 begins a loop which reads each cylinder on the disk drive being searched. At block 100, search process 38 uses the 'BIOSDISK' function to fill a memory buffer with data from the disk drive. At block 102 the cylinder and head location being searched are printed to the screen and the time remaining is calculated and displayed for the user. At block 104, search process 38 searches the buffer for an occurrence of any of the data items for which search process 38 is searching.

Figure 5:
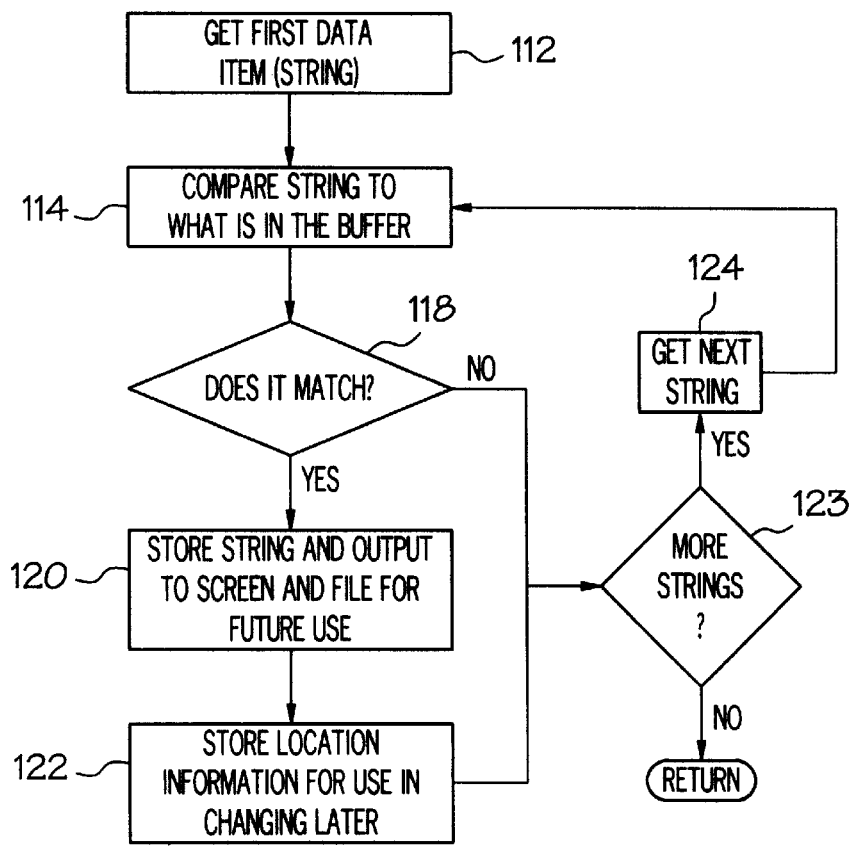
FIG. 5 is a flow diagram illustrating in more detail certain aspects of the process shown in FIG. 4.

FIG. 5 is a flow diagram which illustrates in more detail the process for searching a buffer for a particular data item as represented at block 104 of FIG. 4. At block 112, the first data item in list 33 is obtained. At block 114, the contents of the buffer are compared with the data item to determine if the data item is located in the buffer. If at block 118 it is determined that the data item is not located in the data in the buffer, then at blocks 123 and 124 the next data item is obtained from list 33, and control returns to block 114. If at block 118 the data item was located in the buffer, then at blocks 120 and 122 the data item and the address of the location on the disk drive of the data item are output to the screen and to a file, such as list 40, for later use. If at block 123 additional strings remain to be located, then at block 124 the next data item is obtained, and the loop repeats at block 114 until all the data items in list 33 have been processed. When search process 38 completes, list 40 includes an entry for each occurrence of each data item and its location on the disk drive.

Figures 6, 7:
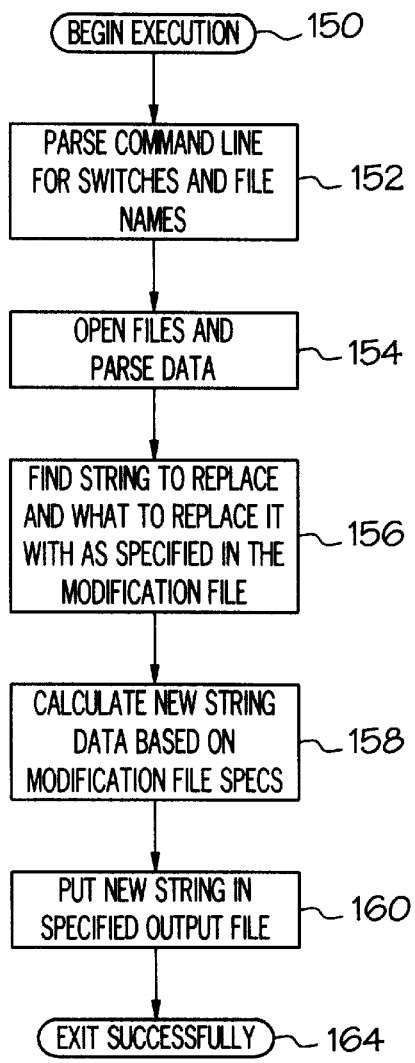
FIG. 6 is a representation of an intermediate data structure.
FIG. 7 is a flow diagram showing a process for modifying the data structure shown in FIG. 6.

The contents of list 40 are now merged with the contents of list 46 to create list 50, which is used by store process 70 to identify the locations on the disk drive to store the unique identifiers for each respective common environment. List 50 can be generated manually, which may be desirable if the number of common environments that will be tailored is relatively small. However, if a large number of common environments will be tailored, the manual generation of list 50 will be time consuming, tedious, and fraught with the possibility of typographical errors. According to one embodiment of this invention, an automated process for generating list 50 from lists 40 and 46 is provided. FIG. 6 shows an intermediate data structure, list 180, which can first be generated. List 180 contains a row of information for each modification necessary to tailor the common environments. Each row contains the MAC address of the computer associated with a common environment, the address of a location on a disk drive where a unique data item will be stored, and the common data item which is currently at that address. Development of a program which generates list 180 is well within the capabilities of those skilled in this art, and in general requires reading list 46, and for each entry in list 46 extracting from list 40 each data item and address, and generating a structure such as shown in list 180.

List 180 is an intermediate structure which is used to generate list 50, which in turn will be used by store process 70 to tailor the common environments. FIG. 7 is a flowchart illustrating a modification process which uses list 180 to generate list 50. At block 150 the modification process is initiated. The modification process accepts two switches which affect its execution. The 'M' switch is used to specify an instruction file name which contains the instructions used by the modification process to change data items 181–184 in list 180. The 'R' switch is used to specify the file name of list 180. The instruction file contains an entry for each type of change the modification process is to make to list 180. Each entry comprises seven fields of data. Each data field will be described with reference to Table 1 below, which illustrates an instruction file with two entries.

TABLE 1

|         | 1   | 2   | 3 | 4  | 5      | 6     | 7      |
|---------|-----|-----|---|----|--------|-------|--------|
| Entry 1 | 1X  | 1   | 1 | -1 | Binary | Right | Zeros  |
| Entry 2 | 13X | 131 | 1 | -1 | Binary | Left  | Spaces |

Field 1: Match identifier—specifies the text in list 180 to change. Thus, Entry 1 of Table 1 indicates that any data item which contains the characters '1X' in list 180 should be changed. Entry 2 in Table 1 indicates that any data item with the text '13X' should be changed.
Field 2: Starting value—indicates the beginning value to which the first occurrence in list 180 of the text in Field 1 should be changed. For example, a '1' in Field 2 indicates that the first occurrence of the text '1X' in list 180 should be changed to a '1'. (Actually it will be '01', '10', '1', or '1', depending on Fields 6 and 7 as discussed below.) Field 2 of Entry 2 indicates that the first occurrence of the text '13X' in list 180 should be changed to a '131'.

Field 3: Interval count value—indicates the interval at which to increment the value in Field 2. For example, Field 3 in Entry 1 indicates that the value in Field 2 should be incremented on each occurrence of the string '1X'. Thus, the second occurrence of the string '1X' in list 180 will be replaced with a '2'.
Field 4: Reset value—indicates that after n number of occurrences of the text in Field 1, the value in Field 2 should be reset. For example, if Field 4 contained a '4', then the first four occurrences of the text '1X' in list 180 would be replaced with the values '1', '2', '3', and '4', respectively, and the fifth occurrence of the text '1X' would be replace with the value '1'. A–1 indicates that the value in Field 2 is never reset.
Field 5: Type specifier—indicates the type of counting system to use during the incrementing of the value in Field 2. There are three types of specifiers. The 'binary' type specifier indicates that the incrementing should be done with a decimal counting system. The 'hex' type specifier indicates that the incrementing should be done with the hexadecimal counting system, and the 'ASCII' type specifier indicates that the incrementing should be accomplished according to the order in the ASCII chart.
Field 6: Justification—indicates whether the justification of the data being written is left or right justified. This is used when the replaced text may have fewer characters than the original data item. For example, the text '1X' requires two bytes of storage. If the text '1X' is replaced with the string '1', the justification field indicates whether the '1' should be left justified in this 2 byte field or right justified.
Field 7: Padding—used in conjunction with Field 6 to indicate whether padding should be spaces or zeros. For example, if Field 7 is set to 'spaces', Field 6 is set to 'Left', and the field '1X' is to replaced by the text '1', the text '1' is used to replace '1X'. If, using the same example, the padding were set to 'Zeros', the text '10' would be used to replace '1X'. If Field 6 were set to 'Right', and Field 7 were set to 'zeros', the text '01' would be used to replace '1X'.

Referring again to FIG. 7, at block 152 the modification process parses the command line for the appropriate switches and files. At block 154 the files are opened and the instruction file is parsed to determine how the data items in list 180 should be modified, as described above. At block 156 a data item is located in list 180, and at block 158 a new unique data item is created based on the instructions for modifying the data item in the instruction file. At block 160 original data item in list 180 is replaced by the unique data item. This process is repeated for each data item in list 180. After processing each data item in list 180, the modification process exits at block 164.

List 50 can be loaded onto file server 20 where it can be accessed from each computer associated with a common environment. In the second phase of the method according to this invention a store process is executed on each computer associated with a common environment, to tailor the common environment according to list 50.

PHASE TWO

Figure 8:
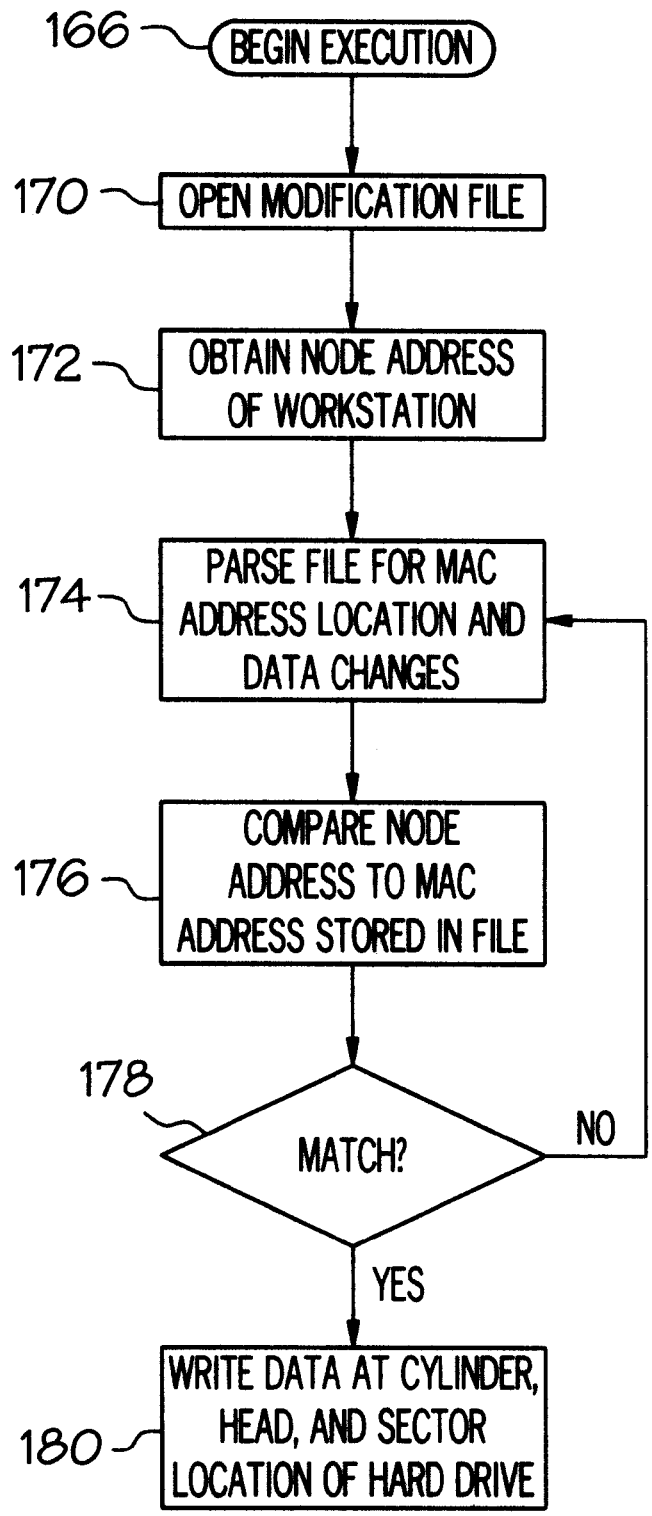
FIG. 8 is a flow diagram showing a process for applying a unique data item to a common environment according to one embodiment of this invention.

FIG. 8 is a flow diagram showing a store process which applies the unique identifiers in list 50 at the appropriate addresses in each common environment. The process described in FIG. 8 is carried out on each computer associated with a common environment which is to be tailored. At block 166 the store process is initiated. Such initiation can occur in several ways. An individual can manually enter the appropriate command at each computer in order to start the initiation of the store process. Another mechanism for initiating the store process is through a remote control process wherein the store process can be remotely initiated from a computer coupled to the network to execute on another computer. Thus, an individual at one computer can cause the initiation of the store process at each computer associated with a common environment without having to move from computer to computer and manually entering the appropriate program execution command.

The store process initiates, and at block 170 list 50 on file server 20 is opened. At block 172 the MAC address of the computer on which the store process is running is obtained. System level calls used to determine the MAC address of a computer are well known to those skilled in the art. At block 174 list 50 is searched by the store process to find the appropriate entries in list 50 for that particular common environment. At blocks 176 and 178 the MAC addresses contained in list 50 are compared to the MAC address of the computer on which the store process is running. The entries for that particular computer are located, and at block 180 the cylinder, head and offset location specified in list 50 are used to write the unique data item specified in list 50 at that location in the common environment. For example, referring to list 50 in FIG. 2, if the MAC address of the computer on which the store process is running is 0x08021083, then the store process determines that row 52 of list 50 contains the appropriate address (entry 53) and unique identifier (entry 55) which it should apply to the specified address (entry 54) in the common environment associated with that particular computer.

Because list 50 contains the addresses indicating where to store the unique data items it takes very little time to carry out the tailoring of each common environment. Thus, after the common environments are initially created, the tailoring of the common environments is extremely rapid. In practice, for example in a testing environment, the testing laboratory may have several disk images located on file server 20, any one of which can be used to commonly configure the computers with a particular test environment. Each such disk image can have an associated modification file, such as list 50, which is maintained on the file server and which can be used to tailor the individual computers quickly. Although the creation and generation of list 50 requires some initial set up time, as described above, such set up time need only occur once for each disk image, as each respective disk image will be identical each time it is used to commonly configure the various computers.

Similarly, it is not unusual for a business to implement large numbers of computers for its employees at one time. For example, a business may intentionally order a large number of computers to reap the benefits of a volume purchase. Conventionally, each computer must be manually configured for each employee, resulting in a tedious and time consuming process which lends itself to making minor typographical errors which can be difficult to track down. The method and system according to this invention can be used to automate such a configuration process, and greatly reduces the likelihood of errors being made during the configuration process.

The method and system according to one embodiment of this invention operates in a Novell NetWare SPX/IPX environment, which enables each commonly configured computer to initially establish communications with a file server even though the common environments are identical to each other, since the IPX protocol uses the MAC address of the computer (which will always be unique) for message transmission. However, even for other networking environments, such as a TCP/IP environment which do require the establishment of a unique network identifier before the computer can communicate over a network, mechanisms exist which enable any computer to initially communicate with a file server. For example, mechanisms which dynamically allocate IP addresses can be used to allow the store process to initially read list 50 from file server 20 even though at the time the store process is executing the IP address in the common environment is not unique. For example, in certain environments the Dynamic Host Configuration Protocol (DHCP) can be used to dynamically allocate IP addresses. Other such mechanisms are known to those skilled in the art and can be used to allow the store process to initially execute.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that scope of the invention be defined by the claims appended hereto.

I claim:

1. A method for applying a unique identifier to each of a plurality of common environments, comprising the steps of:
   (a) searching for a first data item in at least one of said common environments;
   (b) locating the first data item in the common environment;
   (c) storing a first data item address indicating the location of the first data item in the common environment;
   (d) for each of the plurality of common environments, creating a unique second data item; and
   (e) for each of the plurality of common environments, storing one of the unique second data items at the first data item address in each respective common environment, wherein the unique second data item stored at the first data item address in each common environment is distinct from the unique second data item stored at the first data item address in the other common environments.

2. A method according to claim 1, further comprising reading said first data item from a first data item file before searching said common environment.

3. A method according to claim 1, further comprising storing the first data item address in a first file.

4. A method according to claim 3, further comprising determining an environment identifier for each said common environment.

5. A method according to claim 4, further comprising storing each environment identifier of each respective common environment in a second file.

6. A method according to claim 5, further comprising reading the first data item address from the first file, reading the environment identifiers from the second file, and generating a merge data file, said merge data file comprising the environment identifier of each respective common environment and the first data item address.

7. A method according to claim 6, further comprising storing each said unique second data item in said merge data file, and associating in the merge data file each said unique second data item with a respective environment identifier.

8. A method according to claim 7, wherein the storing step comprises: for each of the plurality of common environments, determining the environment identifier of the respective common environment, reading from the merge file the unique second data item associated with the respective environment identifier, reading from the merge file the first data item address, and storing the unique second data item at the first data item address of the respective common environment.

9. A system for applying a unique identifier to each of a plurality of common environments, comprising:

a search process to find a first data item in one of the common environments, the search process recording a first data item address of the first data item;

a data item structure containing a plurality of unique second data items; and a store process for using the first data item address and the plurality of unique second data items to store one of the unique second data items at the first data item address of each of the respective common environments.

10. A system according to claim 9, further comprising a plurality of computers, each of said computers associated with one of said plurality of common environments.

11. A system according to claim 10, further comprising an identification list of environment identifiers, each environment identifier being associated with a respective computer.

12. A system according to claim 11, wherein the first data item address is recorded in an address structure, further comprising a merge process for reading the environment identifiers from the identification list and the first data item address from the address structure and generating a merge file including the environment identifier of each respective computer and the first data item address.

13. A system according to claim 12, wherein the merge file further comprises the plurality of unique second data items, and each unique second data item is associated with one of the environment identifiers.

14. A system according to claim 13, wherein for each common environment, the store process determines the environment identifier of the computer associated with the respective common environment, reads the unique second data item associated with the respective environment identifier, and stores the unique second data item at the first data item address of the respective common environment.

15. A computer readable medium comprising a computer program which executes a method capable of applying a unique identifier to each of a plurality of common environments, comprising the steps of:

(a) searching for a first data item in at least one of said common environments;

(b) locating the first data item in the common environment;

(c) storing a first data item address indicating the location of the first data item in the common environment;

(d) for each of the plurality of common environments, creating a unique second data item; and (e) for each of the plurality of common environments, storing one of the unique second data items at the first data item address of the respective common environment.

16. A system for creating a plurality of unique environments from a plurality of common environments, each of the common environments coupled to a drive, each drive having an identical range of drive addresses which contains identical data, comprising:

locator means for locating a first data item in one of the common environments and determining the address of the first data item in the common environment;

a data item structure containing a plurality of unique second data items, each said unique second data item being unique with respect to each other;

identifier means for identifying a particular common environment; and store means for storing one of the unique second data items at the address of the particular common environment.

17. A system for tailoring a plurality of common environments, comprising:

a file server coupled to a network;

a plurality of computers coupled to the network, each computer having a commonly configured storage device;

a search process for identifying a first data item address of a first data item on one of the commonly configured storage devices;

a data structure containing a plurality of unique data items; and a store process for storing one of the unique data items at the first data item address on each of the commonly configured storage devices.

\* \* \* \* \*